(12) United States Patent
Mohrmann

(10) Patent No.: US 11,608,140 B2
(45) Date of Patent: Mar. 21, 2023

(54) BELT DRIVE

(71) Applicant: ARNTZ BETEILIGUNGS GMBH & CO. KG, Höxter (DE)

(72) Inventor: Detlef Mohrmann, Altenbeken (DE)

(73) Assignee: ARNTZ BETEILIGUNGS GMBH & CO. KG, Hoxter (DE)

( * ) Notice: Subject to any disclaimer, the term of this patent is extended or adjusted under 35 U.S.C. 154(b) by 294 days.

(21) Appl. No.: 17/043,092

(22) PCT Filed: Mar. 8, 2019

(86) PCT No.: PCT/EP2019/055906
§ 371 (c)(1),
(2) Date: Sep. 29, 2020

(87) PCT Pub. No.: WO2019/185330
PCT Pub. Date: Oct. 3, 2019

(65) Prior Publication Data
US 2021/0024172 A1    Jan. 28, 2021

(30) Foreign Application Priority Data
Mar. 29, 2018    (DE) ..................... 10 2018 107 642.8

(51) Int. Cl.
*B62M 9/16*    (2006.01)
*B62M 9/02*    (2006.01)
(Continued)

(52) U.S. Cl.
CPC ............... *B62M 9/16* (2013.01); *B62M 9/02* (2013.01); *F16H 7/023* (2013.01); *F16H 7/08* (2013.01);
(Continued)

(58) Field of Classification Search
CPC . F16G 1/28; F16G 5/20; F16H 55/171; F16H 7/023; F16H 2007/0865; F16H 2007/087; B62M 9/16
(Continued)

(56) References Cited

U.S. PATENT DOCUMENTS 443,591 A * 12/1890 Casgrain ................. F16H 7/023
474/148
538,895 A * 5/1895 Baird ........................ F16G 1/28
474/204
(Continued)

FOREIGN PATENT DOCUMENTS

DE    1290403 B    3/1969
DE    4239300 A1    5/1994
(Continued)

*Primary Examiner* — Henry Y Liu
(74) *Attorney, Agent, or Firm* — WCF IP

(57) ABSTRACT

The invention relates to a belt drive (24) with (a) a first pulley wheel (12) in the form of a drive sprocket with drive teeth (16), (b) a second pulley wheel in the form of an output sprocket (18) and (c) a toothed belt (22) that (i) connects the drive sprocket (12) and the output sprocket (18) for transmitting a force and (ii) has a belt back (38) and (iii) a plurality of teeth (34), wherein a tooth base (36) is situated between two adjacent teeth. According to the invention, (d) the toothed belt (22) comprises a plurality of recesses (26), each of which is configured in a tooth base (36), and (e) at least one pulley wheel features guide projections (28) for engaging in the recesses (26).

17 Claims, 5 Drawing Sheets

Figure 1:
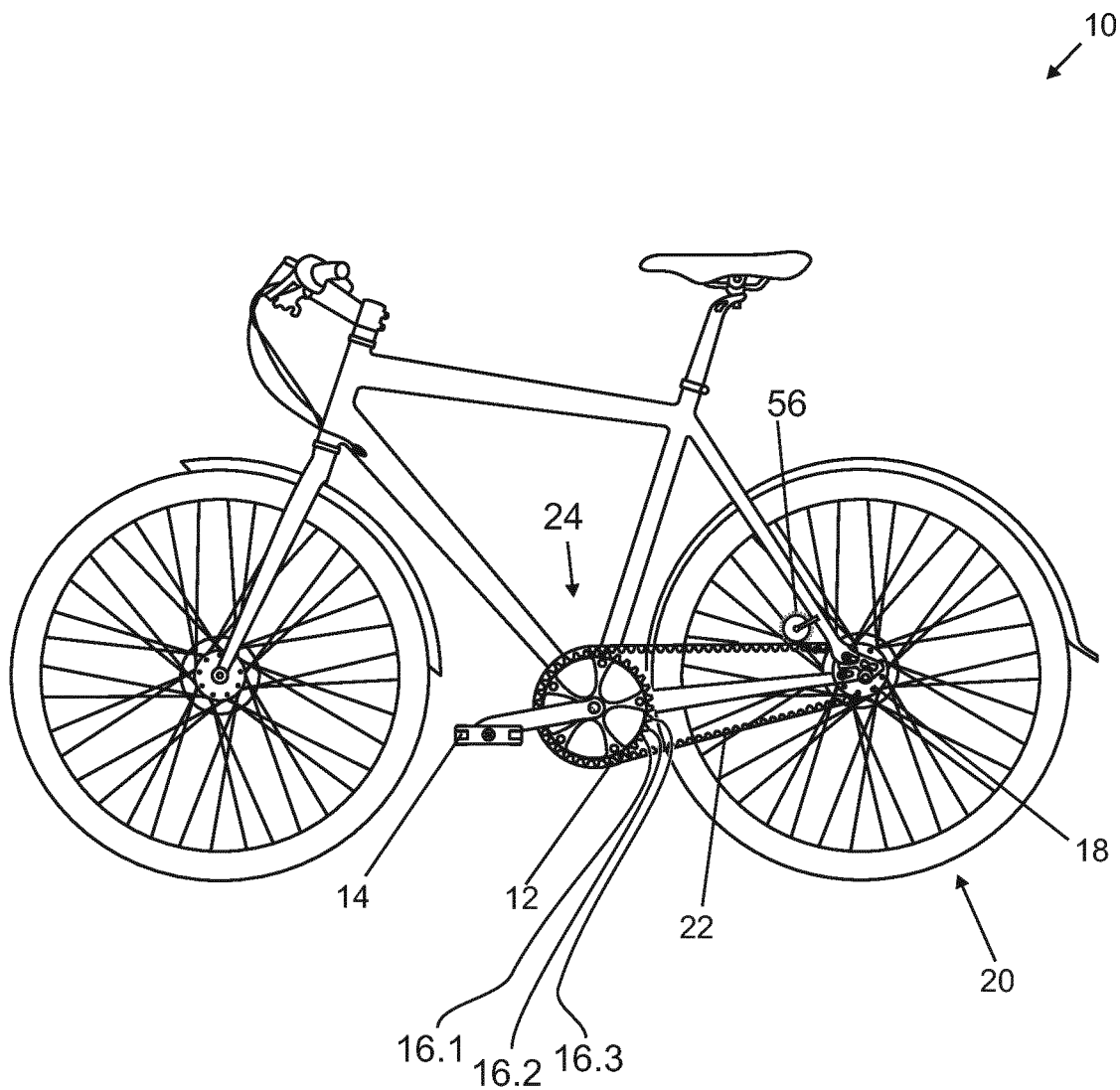

(51) Int. Cl.
  *F16H 7/02* (2006.01)
  *F16H 7/08* (2006.01)
(52) U.S. Cl.
  CPC ............. *F16H 2007/087* (2013.01); *F16H 2007/0865* (2013.01)
(58) Field of Classification Search
  USPC ........................................... 474/205
  See application file for complete search history.

(56) References Cited

U.S. PATENT DOCUMENTS

| | | | | |
|---|---|---|---|---|
| 3,120,409 A * | 2/1964 | Beall | ............... | B62D 55/12 305/179 |
| 3,194,082 A * | 7/1965 | Mollenkamp | ............. | F16G 5/20 474/263 |
| 3,338,107 A * | 8/1967 | Elmer | ............... | F16G 1/28 474/153 |
| 3,472,563 A * | 10/1969 | Irgens | ............. | B62D 55/125 305/195 |
| 3,577,794 A * | 5/1971 | Kerfoot, Jr. | ............... | F16G 1/28 474/204 |
| 3,888,132 A * | 6/1975 | Russ, Sr. | ............... | F16G 1/28 474/205 |
| 4,072,062 A * | 2/1978 | Morling | ............. | A01D 45/023 198/604 |
| 4,283,184 A * | 8/1981 | Berg | ............... | F16G 1/28 74/411 |
| 4,332,576 A * | 6/1982 | Stecklein | ............... | F16G 5/20 156/138 |
| 4,543,080 A * | 9/1985 | Tangorra | ............... | F16G 1/08 474/204 |
| 4,545,778 A * | 10/1985 | Koivula | ............... | F16G 1/28 474/205 |
| 4,634,409 A * | 1/1987 | Johnson | ............... | F16G 1/28 474/152 |
| 5,006,096 A * | 4/1991 | Breher | ............... | F16G 1/28 474/205 |
| 5,013,286 A * | 5/1991 | Breher | ............... | F16G 1/28 474/205 |
| 5,041,063 A * | 8/1991 | Breher | ............... | F16G 1/28 474/205 |
| 5,203,861 A * | 4/1993 | Irwin | ............... | F16H 55/30 474/161 |
| 5,221,236 A * | 6/1993 | Raymer | ............... | B62M 9/16 474/134 |
| 5,269,728 A * | 12/1993 | Rogers | ............... | B66D 1/7405 126/607 |
| 6,264,579 B1 * | 7/2001 | Odai | ............... | F16H 7/023 474/252 |
| 6,848,757 B2 * | 2/2005 | Ueno | ............... | B62D 55/244 305/195 |
| 7,144,345 B2 * | 12/2006 | Edamatsu | ............. | F16H 55/171 474/205 |
| 8,136,827 B2 * | 3/2012 | Lumpkin | ............. | F16H 55/171 198/834 |
| 8,480,109 B1 * | 7/2013 | Adams | ............... | B62M 9/02 280/261 |
| 8,979,689 B2 * | 3/2015 | Dierl | ............... | F16H 7/023 474/153 |
| 10,088,020 B2 * | 10/2018 | Cody | ............... | B62M 9/06 |
| 2011/0009219 A1 * | 1/2011 | Dierl | ............... | F16H 55/171 474/202 |
| 2011/0049831 A1 * | 3/2011 | Lumpkin | ............. | F16H 55/171 474/205 |
| 2012/0077631 A1 * | 3/2012 | Wang | ............... | F16H 7/023 474/205 |
| 2012/0202632 A1 * | 8/2012 | Scolari | ............... | F16G 1/20 474/153 |

FOREIGN PATENT DOCUMENTS

| | | |
|---|---|---|
| DE | 112009002092 T5 | 7/2011 |
| DE | 102010020527 A1 | 11/2011 |
| EP | 2245338 B1 | 10/2012 |
| EP | 2 890 916 B1 | 7/2015 |
| TW | 201641836 A | 12/2016 |

* cited by examiner

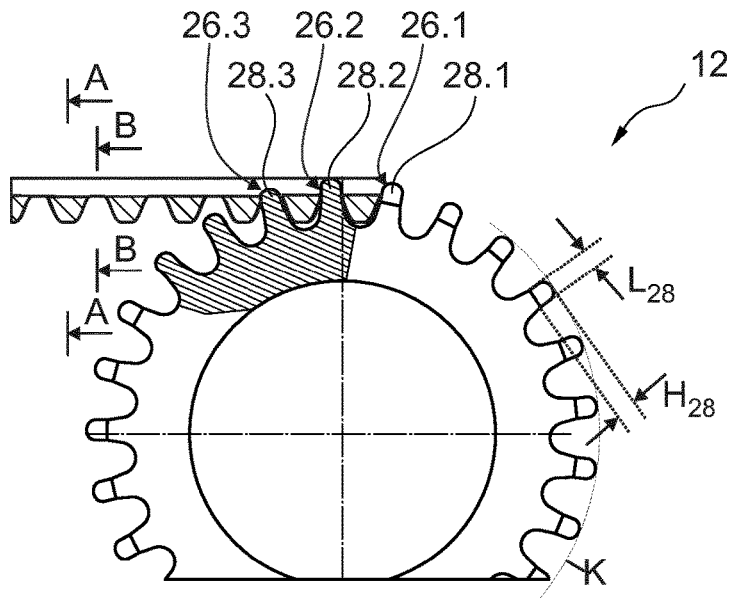
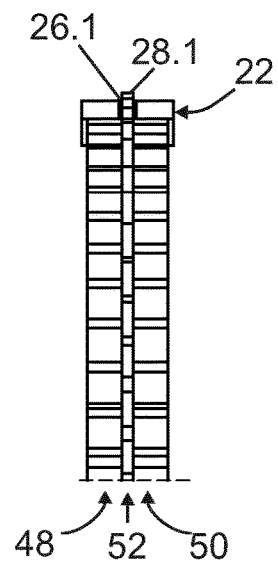
Fig. 4a
Fig. 4b
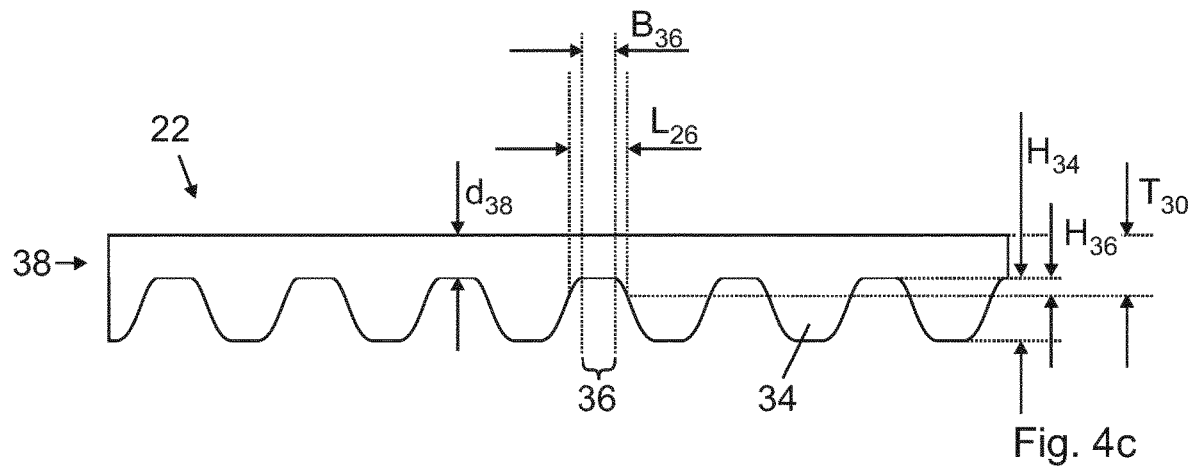
Fig. 4c
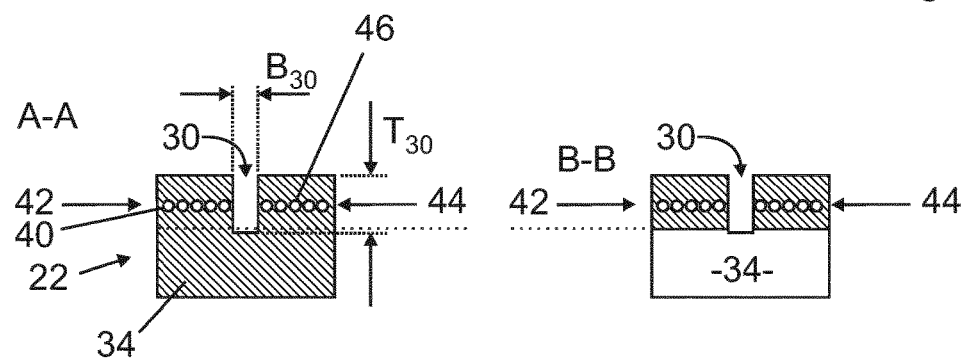
Fig. 4d
Fig. 4e

BELT DRIVE

The invention relates to a belt drive with (a) a first pulley wheel in the form of a drive sprocket, which has drive teeth preferably arranged at equidistant angular steps, (b) a second pulley wheel in the form of an output sprocket and (c) a toothed belt that connects the drive sprocket and the output sprocket for transmitting a force and a rotation, and has a belt back and a plurality of teeth, wherein a tooth base is situated between two adjacent teeth.

Such belt drives have been known for many years and are used, for instance, on bicycles in order to transmit the pedal movement from the pedal crank to the driven rear wheel. In this case, the belt drive should generally be as narrow and light as possible. Belt guides, which are arranged on the pulley wheels in the form of one or two-sided flanges arranged laterally to the toothed belt, are disadvantageous in that the sprockets of the belt drive must therefore be wider than the belt itself. As bicycles are often used in rough environmental conditions, the belt drive should be especially robust. Belt drives also have the disadvantage that the belt tends to skip in case of overload and/or low tension.

U.S. Pat. No. 8,136,837 B2 describes a belt drive according to the preamble which features a guide ring for guiding it axially. The diameter of the guide ring is smaller than an outer diameter of the sprocket. The guide ring engages in a groove configured in the tooth of the toothed belt. A very similar system is also described in U.S. Pat. No. 8,480,109 B1. The disadvantage of such systems is that they are relatively sensitive to dirt.

DE 10 2010 020 527 A1 describes a synchronous belt transmission with which the axial guidance is provided by a bar between two teeth of the sprocket. At the point where this bar is located, the toothed belt has a groove that extends through the tooth. Such a system is also relatively susceptible to dirt.

DE 42 39 300 A1 describes a toothed belt with recesses in the tooth base. This ensures that any air that is compressed by the tooth of the sprocket in the tooth base can escape through the recesses, thereby minimizing noise. The disadvantage of such a system is that a separate system is required for the axial guidance. DE 11 2009 002 092 T5 describes a belt transmission system, the transmission belt of which features projections. The projections engage in recesses in the pulley wheel. Such a system is also relatively susceptible to dirt.

The invention aims to propose a belt drive that is more effectively guided in the axial direction.

The invention solves the problem by way of a belt drive according to the preamble in which the toothed belt features a plurality of recesses, each of which is designed in a tooth base and which are preferably designed to extend continuously through the belt back. It is practical if at least one of the pulley wheels has guide projections for engaging in the recesses.

An advantage of this belt drive is that the toothed belt is guided on both sides in the axial direction by the guide projections. Therefore, any guide forces occur in the middle of the toothed belt, such that flanges are generally unnecessary. Thus, according to a preferred embodiment, the drive sprocket and/or the output sprocket is designed to be flange-free. In other words, this means that there is no support structure axially outside the contact surfaces for the toothed belt to guide the toothed belt axially. This allows the axial width of the overall system to be reduced, which is particularly advantageous when used with bicycles. This can even apply if the toothed belt is slightly wider than on a previous belt drive.

Furthermore, it is advantageous that the tendency to skip in case of low tension and/or overloading can usually be significantly reduced by the guide projections. The skip height that must be overcome is increased by the height of the guide projection in one part of the toothing on the toothed belt. In other words, if there is a tendency to skip, the belt is additionally held in position on the teeth of the belt by the guide projections.

A further advantage is that a foreign body, which may have gotten between the toothed belt and the drive or output sprocket, can often be more easily pushed out to the side by the guide projections. This protects the belt drive from damage. It should be noted that this advantage may occur, but it is not essential that it does.

Within the scope of the present description, a bicycle should be understood particularly to mean a two-wheeled vehicle that can be moved by muscle power. A bicycle has two wheels, namely a front wheel and a rear wheel. A bicycle should also be understood particularly to mean a Pedelec and an e-bike. A Pedelec is a bicycle with an electric motor that only supports the rider if he pedals at the same time. An e-bike should be understood particularly to mean a bicycle with an electric motor which also delivers a torque when the rider does not pedal.

A pulley wheel should be understood to mean a component of the belt drive that rotates during operation and along which the toothed belt runs or around which the toothed belt wraps. The pulley wheel can either be a driven sprocket or an output sprocket or a non-driven roller. The term pulley wheel is thus used as a generic term for these described embodiments.

A recess should be understood to mean a structure which extends from a back side of the toothed belt to a toothed side of the toothed belt opposite the back side. In other words, the recess completely penetrates the belt back of the toothed belt locally.

The radial direction should be understood to mean the direction away from a rotational axis of the respective pulley wheel. In a circular coordinate system whose center lies on the axis of rotation, a movement in the radial direction would be described by a change of the radial component without changing the polar angle.

The belt drive comprises at least one drive sprocket and at least one output sprocket. In the following case, where the indefinite article is used, it should be understood to mean that it is possible that precisely one corresponding object is provided; however, it is also possible that more than one corresponding object is provided.

It is possible, but not essential, for both the drive sprocket and the output sprocket to feature guide projections. It is also possible that neither the drive sprocket nor the output sprocket features guide projections. In this case, the guide projections are arranged on a further pulley wheel, such as a rear roller or an inner roller.

According to a preferred embodiment, the belt back features a groove that extends in the circumferential direction and the recesses extend in a groove base of the groove. The advantage of this is that it renders the recesses especially simple to produce. The groove only need to be designed to be deep enough so that the groove extends locally through the tooth base.

The drive teeth of the drive socket preferably feature the guide projections. Alternatively or additionally, the output socket has output teeth and the guide projections are arranged on the output teeth. In some cases, it is possible that projections are arranged on both the drive teeth and the output teeth. The advantage of this is that a further pulley wheel, for example in the form of a roller, is not required to center the toothed belt.

Preferably, the belt drive has a third pulley wheel in the form of an inner roller with guide projections. It is possible, but not essential, for the inner roller to have teeth that interact with the toothing of the toothed belt. It is sufficient for the guide projections to be arranged to engage in the recesses.

According to a preferred embodiment, the guide projections are arranged to engage in the recesses in a main load-free manner. The main load acts on the toothed belt in the longitudinal direction. The guide projections preferably do not transmit any forces in the longitudinal direction of the toothed belt. The longitudinal direction of the toothed belt is the circumferential direction; the teeth of the toothed belt extend transversely to the longitudinal direction.

Preferably, the guide projections have a projection height in the radial direction that corresponds to at least 0.1-times, but preferably at least 0.8-times, a back thickness of the belt back. The projection height is measured from the tooth tip to the projection tip. In other words, the projection height is measured from the point that lies at the height of the tooth base of the toothed belt when the respective guide projection engages in a recess to the projection tip, i.e. the radially outermost end of the projection. Again in other words, the projection height is the distance by which the guide projection extends into the toothed belt when the respective guide projection engages in a recess. It is possible that the guide projection is so large that it reaches or even protrudes beyond the belt back.

The back thickness should be understood particularly to mean the minimum distance of the tooth base of the toothed belt from a point on the belt back. In other words, the back thickness is the length of the shortest connection between the tooth base and the surface of the belt back.

Preferably, a projection width of the guide projection corresponds at most to a groove width of the groove. This ensures a low-friction engagement of the guide projections in the recesses. It is also beneficial if the projection width is at least one third, but especially preferably at least half, of the groove width.

It is preferable if the groove width is at most half the toothed belt width; preferably, it is at most a fifth of the belt width.

It is beneficial if the guide projections have a projection length $L_{28}$, which corresponds to at least 0.8-times the width $B_{36}$ of the tooth base. The projection length is the arc length of a guide projection along the addendum circle of the respective sprocket on whose teeth it is configured. If the guide projections are not configured on one of the sprockets, the projection length is the length of the respective section with which the guide projection in the tooth base engages in the recesses.

In particular, the projection length $L_{28}$ corresponds to the circumferential length resulting from the points of intersection (a) of an arc of an envelope circle, the center point of which corresponds to the center point of the sprocket and which touches the outermost contours of the teeth of the sprocket, and (b) the outward extension of the left and right flank contours of the tooth of the sprocket. This does not rule out the possibility that the projection length ($L_{28}$) is smaller or larger than the ideal length described above. For example, the projection length may be 0.8-times smaller or 1.1-times larger than the ideal projection length described above. Here, the projection length is not larger than the recess length $L_{26}$.

Preferably, the belt back has a first load cord and a second load cord, wherein the load cords are separated by the groove. In other words, there is no continuous connection between the first load cord and the second load cord.

In other words, the belt back features a first tension load cord layer and a second tension load cord layer that are separated by the groove. The groove extends between the two tension load cord layers. The tension load cord layers can also be described as load support layers.

The groove depth is preferably at least as high as the back thickness, thereby forming a recess. The groove depth is preferably smaller than the sum of the back thickness $d_{38}$ and 0.9-times, preferably 0.5-times, the tooth height $H_{34}$. In the axial direction, the teeth are therefore continuous from one side to the other outside of the tooth base. The load-carrying capacity of the individual teeth is barely reduced. In addition, both load support layers are connected to one another via the teeth.

Of course, it is possible that the belt drive has a second groove with a second groove base, wherein some of the recesses also extend in the second groove base. However, it is especially beneficial if precisely one groove is provided. More than two grooves are also possible.

Sprockets according to the invention can be produced as single pieces, for instance by way of high-pressure die casting, particularly aluminium high-pressure die casting, or injection molding, in particular using a fiber-reinforced plastic.

To simplify production, it is beneficial for a sprocket with guide projections to feature a first sprocket element, a second sprocket element and a guide element, which is arranged in the axial direction between the first sprocket element and the second sprocket element. The guide projections are then only configured on the guide element. These sprockets do not have any grooves that would have to be machined separately.

However, it is also possible that the guide element and the sprocket are made of different materials. It is possible, for example, to subsequently apply the guide projections to a sprocket. Here, the connection technology methods known from the prior art are to be applied. This renders it possible for parts that act as guide projections to be mounted on the sprocket, e.g. by inserting dowel pins in bores, screws in threads or gluing in bores. Here, the parts can have a shape radially outside that is ideal for the guide. Furthermore, it is possible to provide a one-piece sprocket with a groove, wherein two sprocket segments are then formed. A guide element is then inserted into the groove of the sprocket.

Preferably, the belt drive comprises another, for instance a third or a fourth, pulley wheel in the form of a rear roller, which comprises a first, in particular a cylinder barrel-shaped, support surface and a second, in particular a cylinder barrel-shaped, support surface, wherein the guide projections are configured between the support surfaces in the axial direction. Alternatively or additionally, a guide projection is configured in the axial direction between the support surfaces, projecting radially beyond the support surfaces, wherein the guide projection engages in the groove and has a guide projection height above the support surfaces. The guide projection height preferably corresponds at most to the groove depth. It is especially beneficial if the fourth pulley wheel comprises at least one guide projection per groove. A further alternative is for the guide projection to feature guide projections that engage in the recesses. It should be noted that it is possible for a fourth pulley wheel to be provided without a third pulley wheel being provided. Furthermore, the rear roller can be designed in such a way that small or no support surfaces are provided. Here, the toothed belt supports itself on the guide projection in the groove base.

It is beneficial if the toothed belt comprises a textile layer that is designed on the side facing the output sprocket. Such a textile layer reduces the friction and increases the strength of the toothed belt.

According to a preferred embodiment, the recesses extend from a back side of the toothed belt to a tooth side of the toothed belt that lies opposite the back side; in other words, the recesses permeate the toothed belt.

Preferably, the guide projections guide the toothed belt in the axial direction. In other words, the guide projections counter a force that pushes the toothed belt axially outwards away from its path with a guide force that prevents it from being pushed away. In particular, only the guide projections guide the toothed belt in the axial direction. In other words, in this case there is no additional component that could effect axial guidance on its own, i.e. in the absence of guide projections.

The invention also describes a vehicle, especially a bicycle, with (a) a belt drive according to the invention, (b) a pedal crank that is connected to the drive sprocket and (c) a rear wheel that is connected to the output sprocket, wherein the toothed belt of the belt drive connects the drive sprocket to the output sprocket and has a belt back which comprises a plurality of recesses, wherein each recess is designed in a tooth base. The projections of the drive sprocket and/or the output sprocket are arranged to engage in the recesses. Preferably, guide projections are configured on the drive sprocket and/or the output sprocket for engaging in the recesses. However, the vehicle needs not be a bicycle; in particular, it may also refer to a motorcycle or another motor vehicle.

Figure 2A:
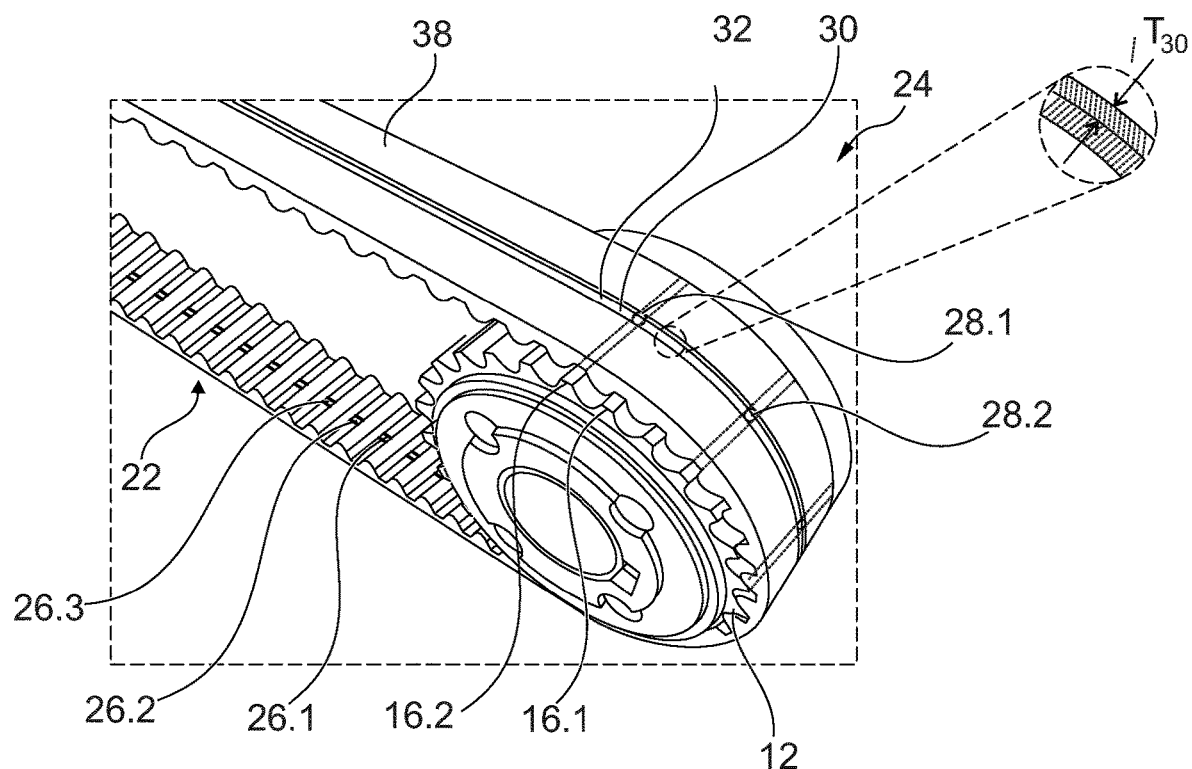
Figure 2B:
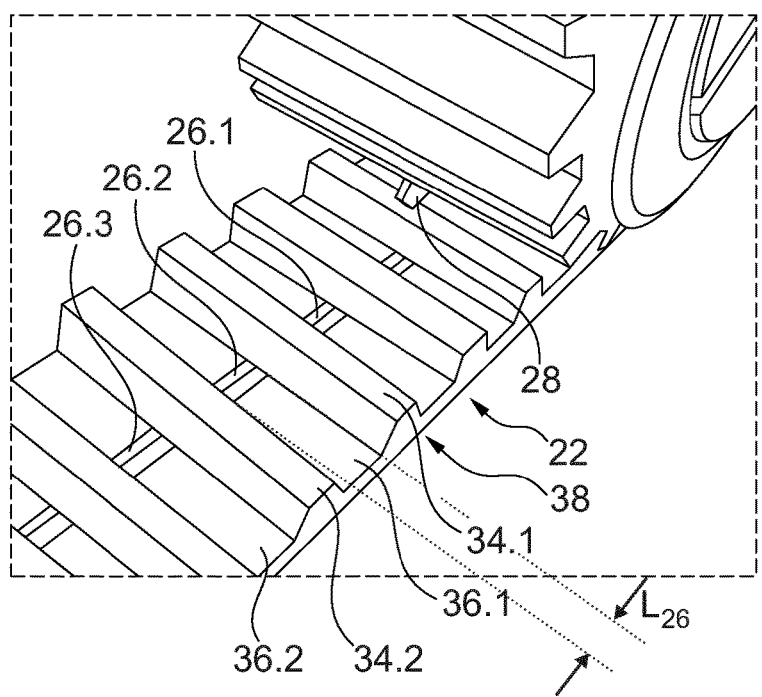
Figure 3A:
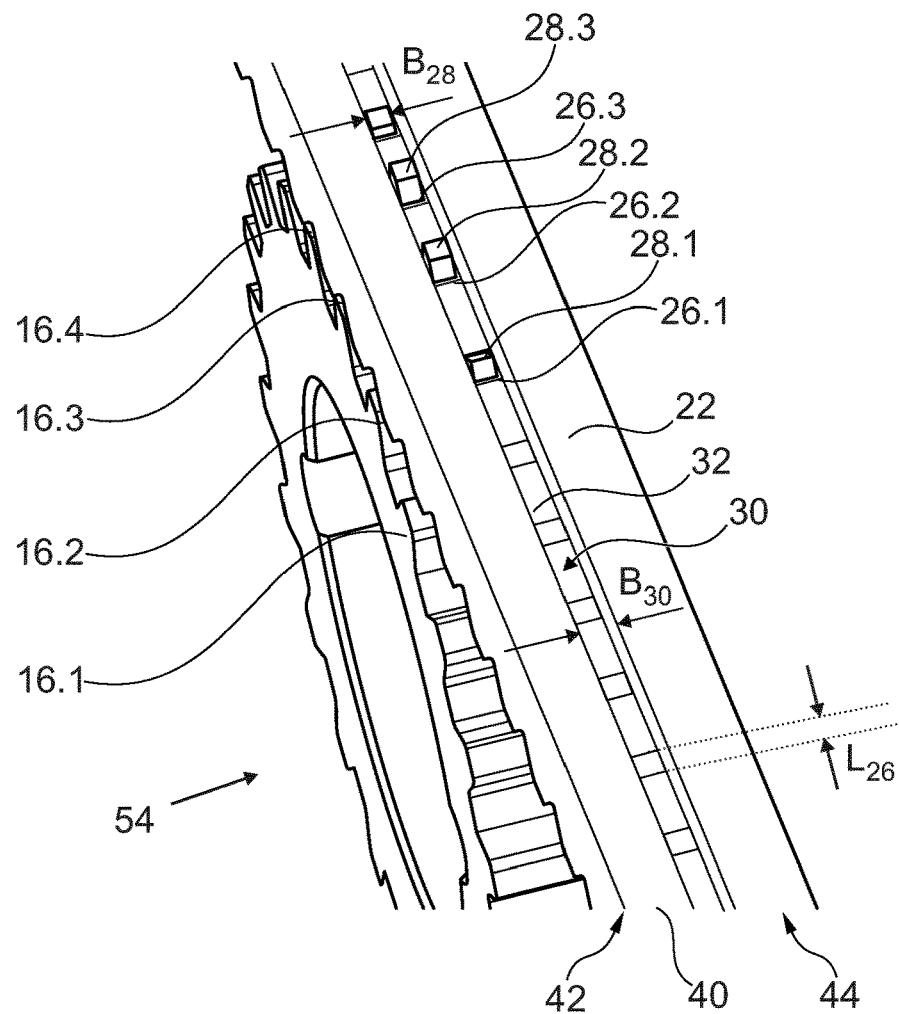
Figure 3B:
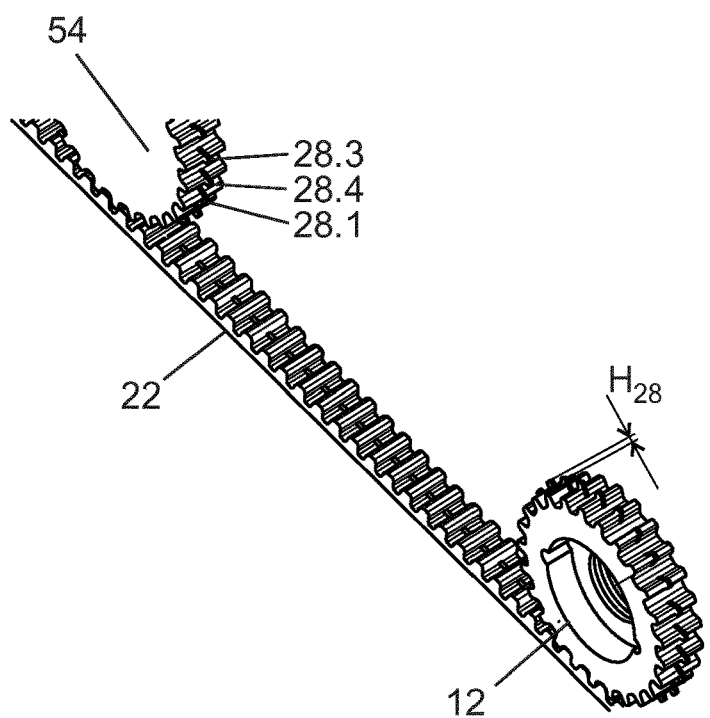
Figure 5:
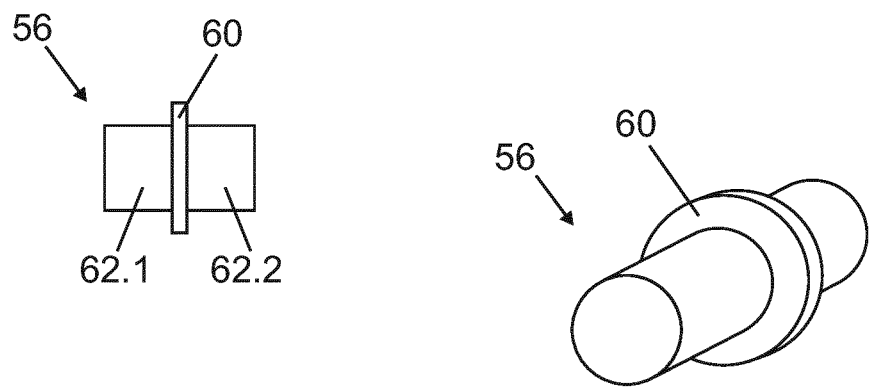

In the following, the invention will be explained in more detail by way of the attached figures. They show:

FIG. 1 a vehicle according to the invention in the form of a bicycle,

FIG. 2a a perspective partial view of a belt drive according to the invention,

FIG. 2b a second perspective partial view of a belt drive according to the invention, FIG. 3a a perspective partial view of a third pulley wheel in the form of an inner roller for a belt drive according to the invention, FIG. 3b a second perspective partial view of the third pulley wheel according to FIG. 3a, FIG. 4a a side view of a sprocket with a belt of a belt drive according to the invention, partially in a sectional view, FIG. 4b a view of the end face of the sprocket according to FIG. 4a, FIG. 4c a partial side view of the toothed belt of the belt drive, FIG. 4d a sectional view A-A according to FIG. 4a, FIG. 4e a section view B-B according to FIG. 4a and FIG. 5 views of a rear roller according to FIG. 1.

FIG. 1 depicts a vehicle according to the invention in the form of a bicycle 10, comprising a schematically drawn first pulley wheel 12 in the form of a drive sprocket, which is connected to a pedal crank 14. The drive sprocket 12 has a plurality of drive teeth 16.$i$ (i=1, 2, ..., N, wherein N is the number of drive teeth).

The bicycle 10 also features a second pulley wheel 18 in the form of an output sprocket that is connected to the rear wheel 20. Both pulley wheels 12, 18 are connected to a belt drive 24 by means of a toothed belt 22. It should be noted that the belt drive 24 is also suitable for other vehicles than a bicycle, such as motor vehicles, motorcycles or similar. In general, the belt drive 24 is suitable for all drives in power drives, linear drives and conveyor drives.

As an example, the invention is explained on an output sprocket; however, it can be used in the same way on a different pulley wheel or other pulley wheels of the belt drive.

FIG. 2a shows a detailed view of the belt drive 24. It should be noted that the toothed belt 22 comprises a plurality of recesses 26.$j$ (j=1, 2, ..., J). The drive sprocket 12 has guide projections 28.$k$ (k=1, 2, ..., K), each of which is designed to engage in a recess 26.$j$.

FIG. 2a and FIG. 3a show that the toothed belt 22 has a groove in whose groove base 32 the recesses 26 are provided.

FIG. 2b shows that a tooth base 36, for instance the tooth base 36.1 in the present case, is arranged between two teeth 34.1, 34.2, ... of the toothed belt 22. A groove depth $T_{30}$ (see FIG. 4d) is so large that the groove 30 continues into the tooth base 36 (any reference without a numerical suffix refers to all relevant objects). The recesses 26.$j$ can therefore be produced simply by introducing the groove 30 (see FIG. 2a) sufficiently deep into a belt back 38 of the toothed belt 22.

FIG. 3a depicts an inner roller 54, which is constructed like the drive sprocket 12, with the toothed belt 22 in a different perspective. It should be noted that in the embodiment shown in FIG. 3a, every drive tooth 16.$i$ has a guide projection 28.$k$, which engages in a respective recess 26.$j$. A projection width $B_{28}$ corresponds to 0.9-times a groove width $B_{30}$ (see FIG. 4d). In the present case, a projection height $H_{28}$ (see FIG. 3b) corresponds to the groove depth $T_{30}$, i.e. specifically, it deviates from it by at most 10%.

A recess length $L_{26}$ results from the groove depth in the tooth of the toothed belt $H_{36}$ and corresponds in the present case at least to the tooth base width $B_{36}$.

The maximum recess length results from a groove depth that is smaller than the sum of the back thickness $d_{38}$ and 0.9-times the tooth height $H_{34}$.

FIG. 3b depicts a section of a second embodiment of a belt drive according to the invention that comprises an inner roller 54. In the present case, guide projections 28.$k$ are also configured on the inner roller 54. The toothed belt 22 is only partially shown. The part that surrounds the first pulley wheel 12 has been left out.

The inner roller 54 can be designed as described in the following by way of the example of a sprocket. Alternatively, the inner roller can be executed without toothing with cylinder barrel-shaped support surfaces. Alternatively, the inner roller may be composed exclusively of one guide element. In this case, there are no cylinder barrel-shaped support surfaces.

FIG. 4b depicts a preferred embodiment of a belt drive 12, which is designed as a sprocket and comprises a first sprocket element 48, an independent second sprocket element 50 and a guide element 52 arranged between the two sprocket elements 48, 50. These guide projections 28.$k$ (see FIG. 4a) are configured on the guide element 52. The sprocket elements 48, 50 and the guide element 52 are positively connected to one another, for example glued, or, for instance, screwed together. It is also possible that the sprocket elements 48, 50 and the guide element 52 are firmly bonded to one another by melting their surfaces and then compressed. This results in an adhesive-free, firmly bonded connection. Below a guide projection or several guide projections, the guide element 52 may comprise an outer contour that deviates from the sprocket elements 48, 50.

The projection length $L_{28}$ corresponds to the circumferential length resulting from the points of intersection (a) of an arc of an envelope circle, the center point of which corresponds to the center point of a sprocket and which touches the outermost contours of the teeth of the sprocket, and (b) the outward extension of the left and right flank contours of the tooth of the sprocket.

FIG. 4a shows how the toothed belt interacts with the sprocket and, in the sectional view, how the guide projections 28 engage between the teeth 34 and in the recesses 26 (see FIG. 2b).

FIG. 4c depicts a side view of the toothed belt 22. It should be noted that the toothed belt features a belt back 38 with a back thickness $d_{38}$, teeth with a tooth height $H_{34}$ and a tooth base 36 with a tooth base width $B_{36}$. A groove base 32 and a recess 26 with a recess length $L_{26}$ are also indicated.

FIG. 4d depicts a cross section A-A according to FIG. 4a through the toothed belt 22, i.e. through a tooth.

FIG. 4d contains a schematic depiction of a first load cord 40 of the toothed belt 22, which is made of, for example, aramid or carbon fibers and forms a load support layer 42. A second load support layer 44 is separate from the load support layer 42, wherein the second load support layer is composed of a second load cord 46. The groove 30 separates the two load support layers 42, 44 from one another.

FIG. 4e is a cross section B-B according to FIG. 4a. It should be recognized that the groove continues into the tooth base 36 (see 4c), so that when cutting through the tooth base, as shown in FIG. 4e, the tooth 34, which is not cross-hatched, is continuous in the axial direction.

FIG. 5 shows a rear roller 56, the provision of which is optional. This rear roller can comprise a guide projection 60, which is designed in the axial direction between two support surfaces 62.1, 62.2 and protrudes radially beyond the support surfaces. A guide projection height of the guide projection 60 is at most the groove depth. The guide projection thus engages in the groove and guides the toothed belt 22. It is also possible that the rear roller 56 features guide projections, which protrude beyond the guide projection in the axial direction. In FIG. 1, the rear roller 56 is shown to be in contact with the loaded strand. It is especially beneficial if the rear roller 56 lies against the unloaded strand.

| Reference list | |
|---|---|
| 10 | bicycle |
| 12 | first pulley wheel, drive sprocket |
| 14 | pedal crank |
| 16 | drive tooth |
| 18 | second pulley wheel output sprocket |
| 20 | rear wheel |
| 22 | toothed belt |
| 24 | belt drive |
| 26 | recess |
| 28 | guide projection |
| 30 | groove |
| 32 | groove base |
| 34 | tooth (of the toothed belt) |
| 36 | tooth base (of the toothed belt) |
| 38 | belt back |
| 40 | first load cord |
| 42 | first load support layer |
| 44 | second load support layer |
| 46 | second load cord |
| 48 | first sprocket element |
| 50 | second sprocket element |

| Reference list | |
|---|---|
| 52 | guide element |
| 54 | inner roller |
| 56 | rear roller |
| 60 | guide projection |
| 62 | support surfaces |
| i | number index |
| j | number index |
| k | number index |
| $T_{30}$ | groove depth |
| $B_{28}$ | projection width |
| $B_{36}$ | tooth base width |
| $B_{30}$ | groove width |
| $H_{28}$ | projection height |
| K | envelope circle |
| $L_{26}$ | recess length |
| $L_{28}$ | projection length |
| $d_{38}$ | back thickness |
| $H_{34}$ | tooth height |
| $H_{36}$ | groove depth in the tooth of the toothed belt |

The invention claimed is:

1. A belt drive, comprising:
a first pulley wheel in a form of a drive sprocket with drive teeth;
a second pulley wheel in a form of an output sprocket; and
a toothed belt which
connects the drive sprocket and the output sprocket for transmitting a force,
has a belt back, and
a plurality of teeth, wherein one of a plurality of tooth bases is situated between each two adjacent teeth,
wherein the toothed belt comprises a plurality of recesses, each of which is configured in an individual tooth base of said plurality of tooth bases,
wherein at least one pulley wheel of said first and second pulley wheels comprises guide projections for engaging in individual recesses of the plurality of recesses,
wherein the guide projections engage in individual recesses of the plurality of recesses in a main load-free manner.

2. The belt drive according to claim 1 further comprising a third pulley wheel in a form of an inner roller, wherein said third pulley has guide projections.

3. The belt drive according to claim 2 wherein the guide projections
have a projection height in a radial direction that corresponds to at least 0.1-times a back thickness of the belt back, and/or
have a projection length that corresponds to at least half the width of the individual tooth base.

4. The belt drive according to claim 1 wherein the plurality of recesses extend from a back side of the toothed belt to a toothed side of the toothed belt opposite the back side.

5. The belt drive according to claim 1 wherein the guide projections guide the toothed belt in an axial direction.

6. The belt drive according to claim 5 wherein only the guide projections guide the toothed belt in the axial direction.

7. The belt drive of claim 3 wherein either the projection height or the projection length is at least 0.8 times the back thickness or the width of the individual recess, respectively.

8. The belt drive according to claim 2, wherein the groove has a groove depth which is greater than a back thickness of the belt back, or is at least a sum of the back thickness and 0.1-times a tooth height.

9. A vehicle, comprising:
a belt drive according to claim 1,
a pedal crank connected to the drive sprocket of the belt drive, and
a rear wheel connected to the output sprocket of the belt drive.

10. The vehicle of claim 9 wherein the vehicle is configured as a bicycle.

11. A belt drive, comprising:
a first pulley wheel in a form of a drive sprocket with drive teeth;
a second pulley wheel in a form of an output sprocket; and
a toothed belt which
    connects the drive sprocket and the output sprocket for transmitting a force,
    has a belt back, and
    a plurality of teeth, wherein one of a plurality of tooth bases is situated between each two adjacent teeth,
wherein the toothed belt comprises a plurality of recesses, each of which is configured in an individual tooth base of said plurality of tooth bases,
wherein at least one pulley wheel of said first and second pulley wheels comprises guide projections for engaging in individual recesses of the plurality of recesses,
wherein the belt back has a groove that extends in a circumferential direction, and
wherein each of the plurality of recesses extend in a groove base of the groove.

12. The belt drive according to claim 11, wherein the groove has a groove depth which is greater than a back thickness of the belt back, or is at least a the sum of the back thickness and 0.1-times a tooth height.

13. A belt drive, comprising:
a first pulley wheel in a form of a drive sprocket with drive teeth;
a second pulley wheel in a form of an output sprocket; and
a toothed belt which
    connects the drive sprocket and the output sprocket for transmitting a force,
    has a belt back, and
    a plurality of teeth, wherein one of a plurality of tooth bases is situated between each two adjacent teeth,
wherein the toothed belt comprises a plurality of recesses, each of which is configured in an individual tooth base of said plurality of tooth bases,
wherein at least one pulley wheel of said first and second pulley wheels comprises guide projections for engaging in individual recesses of the plurality of recesses,
wherein the drive sprocket features drive teeth on which guide projections are arranged, and/or
wherein the output sprocket features output teeth on which the guide projections are arranged.

14. A belt drive, comprising:
a first pulley wheel in a form of a drive sprocket with drive teeth;
a second pulley wheel in a form of an output sprocket; and
a toothed belt which
    connects the drive sprocket and the output sprocket for transmitting a force,
    has a belt back, and
    a plurality of teeth, wherein one of a plurality of tooth bases is situated between each two adjacent teeth,
wherein the toothed belt comprises a plurality of recesses, each of which is configured in an individual tooth base of said plurality of tooth bases,
wherein at least one pulley wheel of said first and second pulley wheels comprises guide projections for engaging in individual recesses of the plurality of recesses, and
wherein the belt back
(a) comprises a first load cord and a second load cord, and wherein the first and second load cords are separated by a groove, and/or
(b) comprises a first load support layer and a second load support layer, wherein the first and second load support layers are separated by the groove.

15. A belt drive, comprising:
a first pulley wheel in a form of a drive sprocket with drive teeth;
a second pulley wheel in a form of an output sprocket; and
a toothed belt which
    connects the drive sprocket and the output sprocket for transmitting a force,
    has a belt back, and
    a plurality of teeth, wherein one of a plurality of tooth bases is situated between each two adjacent teeth,
wherein the toothed belt comprises a plurality of recesses, each of which is configured in an individual tooth base of said plurality of tooth bases,
wherein at least one pulley wheel of said first and second pulley wheels comprises guide projections for engaging in individual recesses of the plurality of recesses,
wherein at least one of the drive sprocket and output sprocket comprises
    a first sprocket element,
    a second sprocket element, and
    a guide element arranged in an axial direction between the first sprocket element and the second sprocket element, and
wherein the guide projections are only configured on the guide element.

16. A belt drive, comprising:
a first pulley wheel in a form of a drive sprocket with drive teeth;
a second pulley wheel in a form of an output sprocket;
a toothed belt which
    connects the drive sprocket and the output sprocket for transmitting a force,
    has a belt back, and
    a plurality of teeth, wherein one of a plurality of tooth bases is situated between each two adjacent teeth,
wherein the toothed belt comprises a plurality of recesses, each of which is configured in an individual tooth base of said plurality of tooth bases,
wherein at least one pulley wheel of said first and second pulley wheels comprises guide projections for engaging in individual recesses of the plurality of recesses; and
a fourth pulley wheel in a form of a rear roller, which features
    a first support surface and
    a second support surface,
wherein the guide projections are arranged in an axial direction between the first and second support surfaces and protrude radially beyond the first and second support surfaces, and
wherein the guide projections engage in the groove.

17. The belt drive according to claim 16 wherein both the first and second support surfaces are cylinder-barrel shaped.

* * * * *